Figure 1:
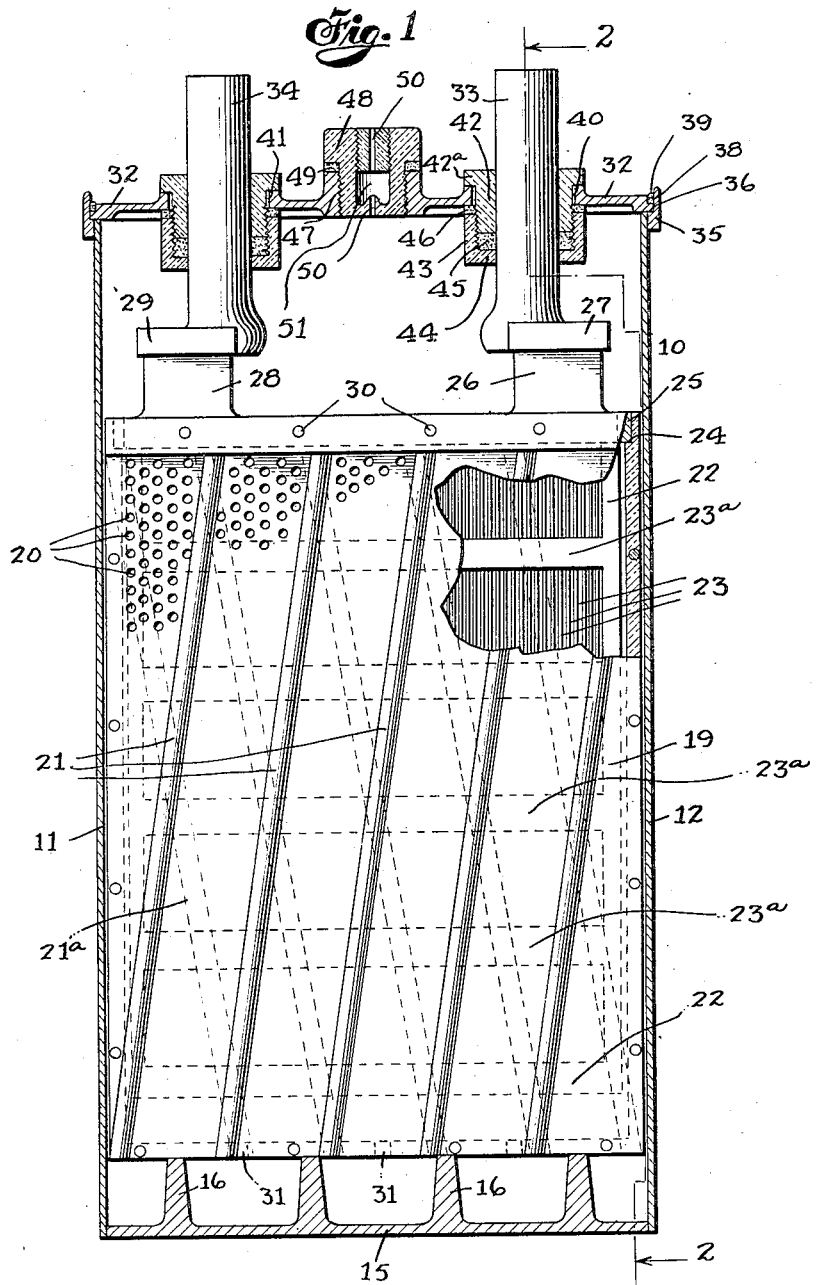

Jan. 13, 1925.  1,522,615
T. S. COLE
CASING CONSTRUCTION FOR STORAGE BATTERIES
AND THE LIKE AND ART OF SEALING THE SAME
Filed March 11, 1922    2 Sheets-Sheet 1

Theodore S. Cole Inventor
By his Attorneys
Emery, Varney, Blair & Hognet

Jan. 13, 1925.                                                1,522,615
T. S. COLE
CASING CONSTRUCTION FOR STORAGE BATTERIES
AND THE LIKE AND ART OF SEALING THE SAME
Filed March 11, 1922          2 Sheets—Sheet 2
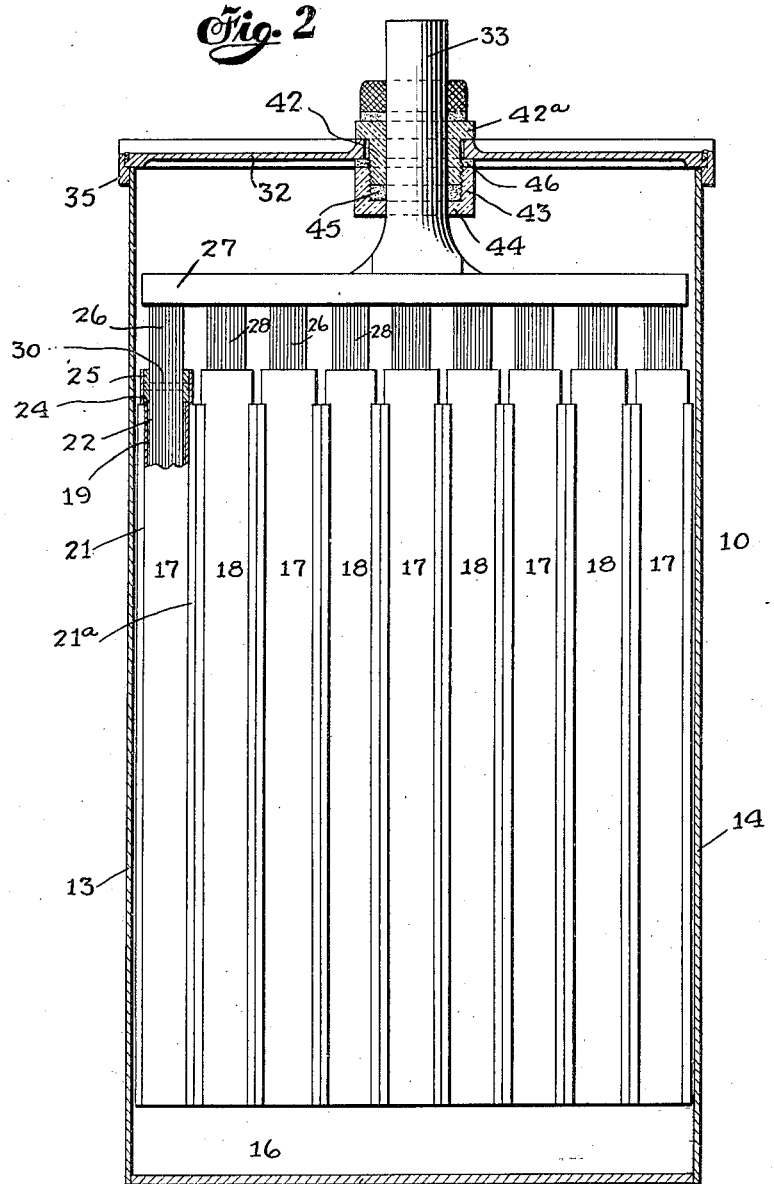
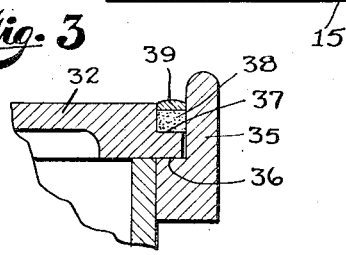

Patented Jan. 13, 1925.

1,522,615

UNITED STATES PATENT OFFICE.

THEODORE S. COLE, OF NEW HAVEN, CONNECTICUT, ASSIGNOR TO SAFETY CAR HEATING & LIGHTING COMPANY, A CORPORATION OF NEW JERSEY.

CASING CONSTRUCTION FOR STORAGE BATTERIES AND THE LIKE AND ART OF SEALING THE SAME.

Application filed March 11, 1922. Serial No. 542,832.

*To all whom it may concern:*

Be it known that I, THEODORE S. COLE, a citizen of the United States, and a resident of New Haven, in the county of New Haven and State of Connecticut, have invented an Improvement in Casing Constructions for Storage Batteries and the Like and Art of Sealing the Same, of which the following is a specification.

This invention relates to storage batteries and more particularly to the construction of storage battery containers or cells.

An object of this invention is to provide a simple, practical and rugged construction for battery cell containers in which are received the elements of a storage cell. Another object is to provide a container construction of the above nature adapted particularly for portable types of storage batteries and that will be well adapted to meet the requirements of hard, practical use to which batteries of this type are subjected. Another object is to provide a simple and practical art of sealing containers of the above nature against the spilling or splashing of electrolyte therefrom; and to provide a seal that may be applied to the container in a feasible and convenient manner. Another object also is to provide a seal of the above type that may be readily removed to permit access to the elements of the storage cell for repair or replacement. Other objects will be in part obvious or in part pointed out hereinafter.

The invention accordingly consists in the features of construction, combination of elements and arrangement of parts and in the several steps and relation of such steps, all as will be illustratively hereinafter described and the scope of the application of which will be indicated in the following claims.

In the accompanying drawings, in which is shown a possible embodiment of this invention, Figure 1 is a central cross section of an assembled storage cell; and Figure 2 is a sectional view of a cell taken along the line 2—2 of Fig. 1.

Figure 3 is a detailed, detached view on an enlarged scale showing more clearly certain features of construction shown also in Figs. 1 and 2.

Similar reference characters refer to similar parts throughout the several views of the drawings.

Referring now to the drawings and more particularly to Figs. 1 and 2, there is indicated generally at 10 a battery cell container preferably of rectangular shape and comprising the side walls 11 and 12 and the end walls 13 and 14 associated with the bottom 15. The container 10 may be made of any suitable material that will resist the action of an electrolyte, such as sulphuric acid, and preferably is composed of a metal such as lead or an alloy, such as lead antimony, which materials are substantially inert with respect to the action of sulphuric acid thereon.

The bottom member 15, which may be integrally formed with the side and end walls or may be suitably secured thereto as by burning, is provided with a plurality of upstanding ribs 16 extending between the opposite end walls 13 and 14. The ribs 16 not only reinforce the bottom member 15 to withstand the weight of the members inserted within the container, but also form the support for a plurality of plates hereinafter termed plate units and adapted to form with the electrolyte the elements of the storage cell. Thus, as will be seen in Fig. 2 of the drawings, there are shown the plate units 17 alternately positioned with respect to the plate units 18 and in abutting relation to one another, the several units being supported upon the ribs 16 of the bottom member 15 and being dimensioned to fit snugly when assembled within the container 10.

Each plate unit comprises an envelope 19 composed of a suitable insulating material such as hard rubber for example and with its side walls amply perforated as shown only partially at 20 in order to provide an adequate and thorough circulation of electrolyte therethrough. Furthermore, each side wall of the envelope 19 is provided with a plurality of preferably integrally formed reinforcing ribs 21 extending in a general longitudinal direction but preferably at an angle to the longitudinal dimension of the envelope so as to provide strength and great rigidity. The reinforcing ribs 21 on one side of the envelope 19 as viewed in Fig. 1 of the drawings slope or are inclined in a direction opposite from that in which the reinforcing ribs 21ᵃ (shown in dotted lines in Fig. 1) are formed in the opposite side wall of the envelope 19.

Each envelope 19 of a plate unit is adapted to support therein the active plate member or elements thereof, and I prefer to construct the active part of each plate unit of a plurality of individual active members or sheets as is more clearly shown in partial section in Fig. 2. Thus, as shown in Fig. 2, there is contained within the envelope 19 a plurality of relatively thin sheets of lead 22 placed flatwise against each other and each formed, as indicated partially in Fig. 1 of the drawings, into a plurality of preferably longitudinally extending individual bars or elements 23. The individual sheets 22, which may for example have a thickness in the neighborhood of one-twentieth of an inch, are formed so as to provide an uncut border portion so that the border portions at the upper ends of the individual sheets 22 may register to permit the assembled sheets 22 to be mounted within the envelope 19. As will be seen in Fig. 2 (and shown also in Fig. 1) of the drawings, the upper end portions of the side walls of the envelope 19 are stepped upon the interior thereof to provide a supporting ledge 24. A lead collar 25 surrounds the registered border upper portions of the assembled sheets 22 and is burned thereto. The collar 25 is fitted so as to be received within the upper end of the envelope 19 and to be supported upon the supporting ledges 24 above described. The individual sheets 22 thus assembled are thus supported in depending relation from the upper end portions of the envelope 19. Furthermore, the sheets 22, as will be seen from Fig. 1 of the drawings, are of a length somewhat less than the inside length of the envelope 19 in order to provide enough space between the lower ends of the sheets 22 and the bottom of the envelope 19 for expansion of the individual sheets 22 and also for the accumulation of active material that may be separated from the active plate elements.

The individual sheets 22 may be formed as above described in any suitable manner and as for the details of their assembly within the envelope 19, reference may be made to my co-pending application Serial No. 542,831 filed Mar. 11, 1922. Suffice it to note at this point that the preferred construction of the active plate members mounted within the envelopes 19 and above briefly described makes available a great area of active material and also permits of an adequate circulation of electrolyte to take place to bring about an intimate contact with all portions of the active material and the electrolyte.

The individual sheets 22 are provided with integrally formed upwardly extending lugs indicated at 26 to permit electrical connection to be made with the sheets 22 forming the active parts of the plate unit. Thus the lugs 26 of the plurality of units 17, which may for example be negative elements, are connected to a connecting strap 27; and the lugs 28 of the units 18, which may for example be positive plate elements of the cell, are connected to an interconnecting strap 29. The connecting straps 27 and 29 are preferably of lead and are burned to the respective lugs of their associated plate units.

Thus it will be seen that the envelopes 19 not only serve to space and separate the active plate elements of adjacent units, but also function as above described to support in depending relation the active plates or plate elements mounted within the envelopes 19. In order to make the mounting of the active plate members 22 within the envelopes 19 more secure, a plurality of rubber pins 30 extending through the envelopes 19, the supporting collar 25 and the upper border portions of the sheets 22 may be employed. Furthermore, in supporting the envelopes 19 upon the supporting ribs 16 of the bottom member 15, adequate space is provided between the ends of the active plate members and the bottom member 15 for the accumulation of sedimentary matter, suitable openings indicated at 31 being provided in the bottom members of the individual envelopes 19. It will therefore be noted that each active plate is encased within an envelope 19 and is thus individually housed and protected. The envelope 19 assures the retention of whatever active material may be separated from the base lead of the plate members 22 in such relation to the plate members 22 that it may partake in the further chemical action of the cell. Furthermore, the construction is such that expansion and contraction of the plate during discharge and charge may readily take place in such manner that buckling is avoided.

As already above noted, the series of envelopes 19 associated with the plate units 17 and 18 are, when in assembled relation as shown in Fig. 2, of a preferably snug fit within the container 10. The housing of each plate within the envelope 19 not only protects each individual plate from possible disarrangement of its parts due to jarring and vibration to which portable batteries are subjected, but also permits the supporting of all of the plate units within the container 10 so as to successfully withstand the vibrations and jars incident to practical use.

The container 10 is provided with a cover plate 32 preferably of lead or lead antimony alloy and provided with suitable openings through which the connecting lugs 33 and 34, connected as by burning to the connecting straps 27 and 29 respectively, may be extended to the exterior thereof for connection in an exterior electrical circuit. Surrounding the open end of the container 10 and suitably secured to the upper ends of the side walls 11 and 12 and the end walls 13 and 14 is a collar 35 preferably of lead or lead antimony alloy (referring to Fig. 3). The collar 35 is stepped upon the interior thereof as at 36 to provide a suitable supporting ledge and is secured to the side and end wall-forming portions of the container 10 in any suitable manner, as for example by burning. When secured to the container 10, the collar 30 is preferably positioned so that the supporting ledge 36 is substantially in registry with the upper edges of the side and end wall-forming portions of the container 10.

The cover plate 32 is formed so as to be received within the collar 35 and to rest upon or be supported by the ledge 36 of the collar 35 and the upper edges of the walls of the container 10. Preferably the edge portions of the cover plate 32 are of increased thickness as compared to the thickness of the plate 32 itself and about its outer edge is undercut or stepped as at 37, thus to provide a space of suitable width between the edge portions of the plate 32 and the collar 35. Within the space thus formed by the undercut portion of the cover plate 32, a suitable material such as asbestos for example indicated at 38 is placed. Superimposed upon the asbestos packing material 37 and extending throughout the entire periphery or edge portion of the plate 32 is a relatively thin strip of lead 39 which, after the assembly of the plate units within the container 10 has been made as hereinbefore described, is burned respectively to the cover plate 32 and the collar 35. During the burning operation the layer of asbestos 38 acts to prevent the actual burning together of the metal of the cover plate 32 and of the collar 35. The lead strip 39 is burned as above described throughout the entire extent peripherally of the cover plate 32 and thus not only secures the cover plate 32 in position with respect to container 10, but also seals the latter with respect thereto.

In the cover plate 32 there are provided openings indicated at 40 and 41 through which the connecting lugs 33 and 34 may extend to the exterior of the cell or container. The connecting lugs 33 and 34 are preferably of circular cross section and provision is made for sealing the connection between the connecting lugs and the cover plate 32. Thus, as will be seen in connection with the connecting lug 33, there extends through the opening 40 a bushing 42 having on its outer end a flange 42$^a$ adapted to seat against the cover plate 32. The bushing 42, which is preferably of an insulating material such as hard rubber for example, is exteriorly threaded at its other end and is adapted to be slipped over the connecting lug 23 so that at its threaded portions it may engage an interiorly threaded sleeve 43 having an end wall member 44 through an opening in which the lug 33 extends. The sleeve member 43 is also preferably of a suitable insulating material such as hard rubber and there is housed within the sleeve 43 and surrounding the lug 33 a suitable packing material 45 which may conveniently take the form, for example, of soft rubber. There is also interposed between the cover plate 32 and the upper end of the sleeve 43 a washer 46 of a suitable packing material, such as soft rubber for example, and, as will be clearly seen from Fig. 1 of the drawings, upon the threading of the bushing 42 into the sleeve 43, the washer 45 will be pressed into tight sealing relation with respect to the lug 33 and the opening in the bushing 42 and the washer 46 will be pressed into tight sealing relation with respect to the bushing 42 and the cover plate 32. The connecting lugs which are thus brought to the exterior of the cell through the cover plate 32 are insulated therefrom and the mechanical connection between the lugs and the cover plate 32 is effectively sealed to prevent leakage of electrolyte out of the container.

It will be noted that the bushing 42 and its associated sleeve 43 are readily placed in assembled relation with respect to the lugs and the cover plate and that the construction thus provided also lends itself to a ready and convenient disassembling of the parts in order to replace the sealing or packing washers when necessary. Furthermore, it will be seen that the sealing of the lugs may be readily adjusted by means of the threaded relation between the several coacting parts. Moreover, it is preferred that the bushing 42 fit loosely within the opening 40 provided in the cover plate 32 in order to avoid the necessity of accurately aligning the several parts of the cover plate 32 with respect to the lugs 33 and 34 when the plate elements associated therewith are assembled and placed within the container 10. The loose play thus provided permits a ready and convenient assembly, and it will be seen that the coacting sealing or packing washers effectively provide against leakage.

At a substantially central portion of the cover plate 32 there is provided a threaded opening 47 through which the electrolyte may be passed into the container or withdrawn therefrom. The opening 47 is closed by means of a threaded plug 48 having a suitable washer 49 for example of soft rubber interposed between the plug 48 and the cover plate 32. The plug 48 is provided with an air vent 50 extending therethrough and at an intermediate portion of the vent 50 there is provided a chamber 51 within the plug 48 in which electrolyte that may find its way upwardly through the vent 50 by reason of splashing thereof is temporarily accumulated and prevented from reaching the exterior of the container.

Thus it will be seen that there has been provided in this invention a storage cell and a container therefor in which the several objects of the invention are achieved and in which many advantages are attained. The cover plate 32 is sealed to the container 10 in a simple manner and, as above noted, by providing preferably a relatively thin strip of lead 39 burned respectively to the cover plate 32 and the walls of the container 10 an exceedingly convenient means is provided for unsealing the container whenever it is necessary to gain access to the interior thereof for purposes of inspection, repair or replacement of the elements therein. It may be noted that it is merely necessary to sever the lead sealing strip 39 to disengage and unseal the cover plate from the container and that this may be conveniently done by means of a knife for example. Furthermore, it will be noted that the entire construction is of great ruggedness, compactness, and well adapted to meet the conditions of hard usage and, at the same time, is adapted for highly efficient electrical or chemical action.

It will also be noted that there has been provided in this invention a simple and practical art of sealing containers and that the art thus provided may be readily carried on in practical use.

It may here be noted that the term "lead" is used throughout in a broad sense to comprehend any metal that is substantially inert with respect to the action of an electrolyte thereon and that may be readily fused or burned to form a connection.

As many possible embodiments might be made of the mechanical features of this invention and as various changes might be made in the precise method of carrying out the above art, it is to be understood that all matter hereinbefore set forth or shown in the accompanying drawings is to be interpreted as illustrative and not in a limiting sense.

I claim as my invention:

1. In construction of the general nature of that herein described, in combination, a container having therein the elements of a storage cell, a lead collar extending around the upper open end of said container, a cover having edge portions of lead adapted to substantially close said container and positioned adjacent said lead collar and spaced therefrom, and means for sealing said cover to said container comprising a strip of lead interposed between said cover and said lead collar and burned respectively to said cover and said lead collar.

2. In construction of the general nature of that herein described, in combination, a container having therein the elements of a storage cell, a lead collar forming a rim extending about the upper open end of said container and upon the exterior thereof, a cover plate having edge portions of lead adapted to substantially close said container supported upon the upper ends of the wall-forming portions of said container and spaced from said collar, and means for sealing said cover plate to said container comprising a lead strip interposed between said cover plate and said lead collar and burned respectively to the edge portions of said cover and to said lead collar.

3. In construction of the general nature of that herein described, in combination, a container having therein the elements of a storage cell, a collar composed of an inert metal extending around the open end portion of said container and being stepped to provide a supporting ledge upon the interior thereof, a cover plate composed of an inert metal for substantially closing said container supported upon the supporting ledge of said collar and spaced from said collar, and means for sealing said cover plate to said container comprising a strip of inert metal interposed between said plate and said collar and burned respectively to said plate and said collar.

4. In construction of the general nature of that herein described, in combination, a container having therein the elements of a storage cell, a lead collar extending throughout the upper open end portions of said container, a lead cover plate adapted to substantially close said container and positioned adjacent to and substantially within said lead collar and in spaced relation therefrom, means for sealing said cover to said container comprising a strip of lead interposed between said cover and said collar and burned respectively to said cover and said collar, and relatively non-fusible means interposed between said cover and said collar and substantially underneath said lead strip for limiting the depth of burning between said lead strip, said cover and said collar.

5. In construction of the general nature of that herein described, in combination, a container having therein the elements of a storage cell, a lead collar extending around the periphery of the open end of said container and being stepped to provide a supporting ledge upon the interior thereof, a lead cover plate for substantially closing said container supported upon said ledge on said collar and in spaced relation with respect to said collar, an asbestos packing interposed between said cover and said collar, and means for sealing said cover to said container comprising a strip of lead interposed between said cover and said collar and superimposed upon said asbestos packing and burned respectively to said cover and said collar, said asbestos packing limiting the depth to which said members may be burned together.

6. In construction of the general nature of that herein described, in combination, a container having mounted therein the elements of a storage cell, a lead collar extending about the exterior of the upper rim portion of said container, a lead cover plate for substantially closing said container positioned within said collar and in spaced relation therefrom and supported upon the upper ends of the wall-forming portions of said container, an asbestos packing interposed between said cover and said collar, and means for sealing said cover to said collar comprising a strip of lead interposed therebetween and superimposed upon said asbestos packing and burned respectively to said cover and said collar, said asbestos limiting the depth to which said members are burned together.

7. In construction of the general nature of that herein described, in combination, a container composed of an inert metal having therein the elements of a storage cell, a cover plate of an inert metal for substantially closing said container mounted adjacent the open end thereof and in spaced relation from the wall-forming portions of said container, an asbestos packing interposed between said cover plate and the wall-forming portions of said container, and means for sealing said cover plate to said container comprising a strip of lead interposed therebetween and superimposed upon said asbestos packing and burned respectively to said cover and said wall-forming portion of said container, said asbestos packing limiting the depth to which said members are burned together.

8. In construction of the general nature of that herein described, in combination, a container having an upper rim portion of lead having therein the elements of a storage cell, a lead cover plate for substantially closing said container, means for supporting said cover plate at the upper end of said container and adjacent to said rim portion, and a strip of lead contacting with and burned respectively to said cover and said rim portion.

9. In construction of the general nature of that herein described, in combination, a container composed of an inert metal having therein the elements of a storage cell, a cover plate composed of an inert metal for substantially closing said container, means for supporting said cover plate at the open end of said container and in spaced relation from the wall-forming portions thereof, and means for sealing said cover plate to said container comprising a strip of lead interposed therebetween and burned respectively thereto.

10. In construction of the general nature of that herein described, in combination, a container composed of an inert metal having therein the elements of a storage cell, a cover plate composed of an inert metal for substantially closing said container, means for supporting said cover plate at the open end of said container and in spaced relation from the wall-forming portions thereof, a relatively non-fusible packing interposed between said cover plate and the wall-forming portions of said container, and means for sealing said cover plate to said container comprising a lead strip interposed therebetween and superimposed upon said packing and burned respectively to said cover plate and said collar, said packing acting to limit the depth to which said members are burned together.

11. In construction of the general nature of that herein described, in combination, a container having therein the elements of a storage cell and having at least its upper edge or rim portion of an inert metal, a cover plate having at least its edge portions of an inert metal adapted to close said container and positioned adjacent said upper rim portion of said container but spaced therefrom, and a strip of metal positioned around the periphery of said cover plate and in engagement with the edge portions thereof and with the rim portion of said container, said strip of metal being intimately united therewith.

12. In construction of the general nature of that herein described, in combination, a container having therein the elements of a storage cell and having at least its upper edge or rim portion of an inert metal, a cover plate having at least its edge portions of an inert metal adapted to close said container and positioned adjacent said upper rim portion of said container, and a strip of metal having a thickness less than that of the edge portions of said cover plate extending around the periphery of the latter and intimately united with both the edge portions of said cover plate and the rim portions of said container.

13. The herein described art of sealing battery containers having therein the elements of an electric cell which consists in positioning a metallic cover plate adjacent the open end of a metallic container, placing a strip of metal about said cover plate and in engagement with both the edge portions of said cover plate and the walls of the container, and uniting said metal strip with both said cover plate and the walls of said container.

14. The herein described art of sealing battery containers having therein the elements of an electric cell which consists in positioning a metallic cover plate adjacent the open end of a metallic container, positioning a metallic strip having a thickness less than that of said cover plate around said cover plate and in engagement both with the edge portions of said cover plate and the walls of said container, and uniting said metal strip with both said cover plate and the walls of said container.

15. The herein described art of sealing battery containers having therein the elements of an electric cell which consists in supporting a cover plate having edge portions of lead adjacent the open end of a container having a lead rim portion, positioning a lead strip in bridging relation to said cover plate and said rim portion and around the periphery thereof, and burning said lead strip respectively to said cover plate and said rim portion.

16. The herein described art of sealing battery containers having therein the elements of an electric cell which consists in supporting a lead cover plate adjacent the open end of a lead container, positioning a lead strip in bridging relation to said cover plate and said container, and burning said lead strip respectively to said cover plate and said container.

17. The herein described art of sealing battery containers having therein the elements of an electric cell which consists in supporting a cover plate having edge portions of lead adjacent the open end of a container having a rim portion of lead and in spaced relation with respect to said rim portion, interposing a non-metallic heat-resisting material between the edge portions of said cover plate and said rim portion of said container, positioning a lead strip in bridging relation to said cover plate and said rim portion and substantially superimposed upon said material, and burning said lead strip respectively to said edge portions of said cover plate and to said rim portion of said container.

18. The herein described art of sealing battery containers having therein the elements of an electric cell which consists in supporting a lead cover plate adjacent the open end of a lead container and in spaced relation with respect thereto, interposing between said cover plate and said container a relatively non-fusible material, interposing a lead strip between said cover plate and said container and superimposed upon said non-fusible material, and burning said lead strip respectively to said cover plate and said container.

19. The herein described art of sealing battery containers having therein the elements of an electric cell which consists in providing a supporting edge on the interior upper open end of a lead container, positioning a lead cover plate upon said supporting ledge and in spaced relation with respect to the walls of said container, interposing between said cover plate and the walls of said container and supporting upon said ledge a relatively non-fusible material, positioning a lead strip in bridging relation to said cover plate and the walls of said container and substantially superimposed upon said non-fusible material, and burning said lead strip respectively to said cover plate and the walls of said container.

20. The herein described art of sealing battery containers having therein the elements of an electric cell which consists in providing a container with a lead collar having a supporting ledge adjacent the upper open end of said container, positioning a lead cover plate upon said supporting ledge, interposing between said cover plate and the main body portion of said lead collar a relatively non-fusible material, positioning a lead strip in bridging relation to said cover plate and the main body portion of said lead collar and substantially superimposed upon said non-fusible material, and burning said lead strip respectively to said cover plate and to the main body portion of said lead collar.

In testimony whereof, I have signed my name to this specification this 24 day of February, 1922.

THEODORE S. COLE.